Dec. 7, 1965  W. FRANTZ  3,221,609
ERROR SENSITIVE FLUID OPERATED ACTUATOR
Filed May 13, 1963
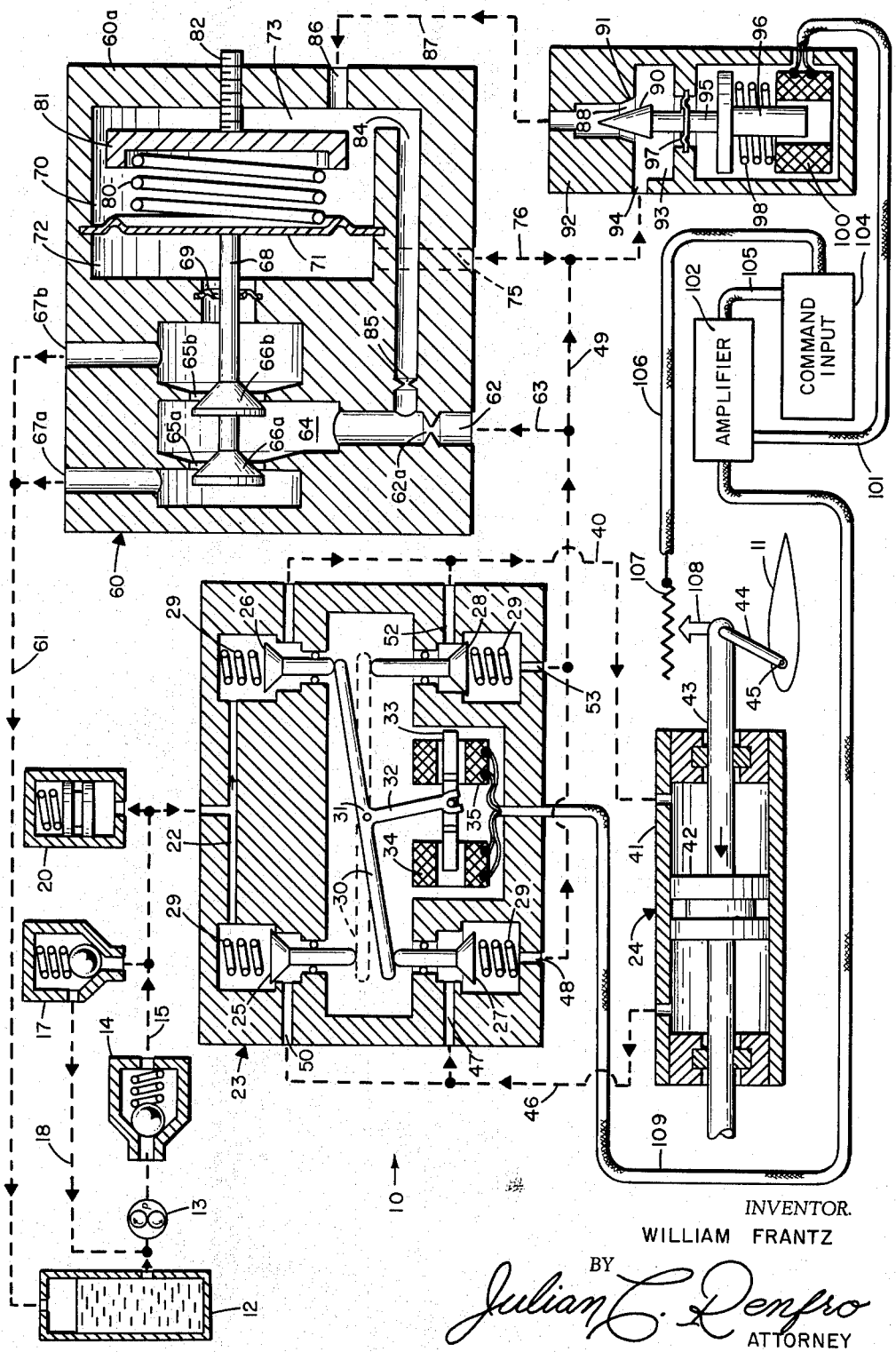
INVENTOR.
WILLIAM FRANTZ
BY
Julian C. Renfro
ATTORNEY United States Patent Office 3,221,609
Patented Dec. 7, 1965

3,221,609
ERROR SENSITIVE FLUID OPERATED
ACTUATOR
William Frantz, Winter Park, Fla., assignor to Martin-Marietta Corporation, Middle River, Md., a corporation of Maryland
Filed May 13, 1963, Ser. No. 279,975
14 Claims. (Cl. 91—405)

This invention relates generally to a variable rate of response arrangement for fluid pressure operated actuating systems having means for permitting and interrupting pressure fluid flow into or out of an actuator such as a hydraulic cylinder connected to an object to be positioned, and more particularly to systems which act to position the object, such as a missile or aircraft control surface, machine tool, regulating valve, or the like, in response to a signal from programming means, position, temperature, pressure, or other sensing means, and which systems include flow limiting means to govern the rate of response to the signal.

Fluid pressure operated actuator systems are known which include pressure fluid flow limiting means or valves in series with actuator means and which may be set to maintain a predetermined flow rate therethrough as long as the transfer or control valve is open. Such arrangements have permitted the use of control or transfer valves of the poppet type which are inherently self cleaning and hence less subject to wear and leakage caused by contaminants in hydraulic fluids than are slide valves or spool valves which can, however, provide their own limiting function.

The flow limiters used heretofore with poppet type control or transfer valves have also limited the actuator to operation at a single predetermined speed regardless of the extent of correction required. Attempts have been made to overcome this undesirable feature by rapidly cycling the poppet valves with adjustable cam means or the like which can variably proportion the open and closed periods of the valve operating cycle. This expedient, sometimes referred to as digitizing, has introduced damaging pulsations and shock. Moreover, digitizing lacks the fineness of operation required for small position corrections and often operates too slow for large position corrections.

With the foregoing in mind, it is a primary object of this invention to provide fluid pressure actuator systems with novel flow limiting means which vary the permitted flow rate in accordance with the degree of correction required so that a variable gain response is achieved which produces rapid correction while the error is large, and a decreasing rate of correction as the desired output is approached.

Another important object of this invention is the provision of a variable flow rate limiter means for providing variable gain response in fluid pressure operated actuator systems utilizing poppet type control or transfer valves, thereby retaining the advantages of insensitivity to pressure fluid contamination characteristic of poppet valves, and yet providing a flexibility and fineness of control not otherwise obtainable with poppet valves.

As another object this invention aims to provide a variable gain actuator system of the foregoing character wherein the power for operating the variable flow limiter is derived from the system fluid pressure supply, thereby substantially reducing or eliminating electrical power requirements and making the system particularly suited to application in control of missiles, and the like, wherein fluid pressure availability and reliability is preferred.

In accordance with variable gain actuator systems embodying my invention the variable flow limiter is connected in series with a control or transfer valve, preferably but not necessarily of the poppet type, and comprises a first pair of orifices, including a variable orifice controlled by pressure responsive means, such as a diaphragm acted upon by a variable control pressure. This control pressure is developed between a gain controlling or second variable orifice and another, preferably fixed, orifice connected in series therewith, but in parallel to the flow of actuating fluid. The second variable orifice is varied by means such as a proportional solenoid in response to an electrical signal corresponding to the error in position of a flight control surface or other object to be controlled by the actuator. As the actuator moves the control surface toward the desired position the error signal is reduced causing the second variable orifice associated with the proportional solenoid to change the control pressure for the first variable orifice in a direction causing the flow limiter to reduce the rate of pressure fluid flow to or from the actuator.

In one preferred embodiment in which the variable response or gain occurs only for positional errors greater than a predetermined error, the first variable orifice associated with the flow limiter is controlled by a valve member which is positioned by a diaphragm acted upon in one direction by the line pressure in the actuator and in the other direction by an adjustable loading spring and by the control pressure from the second variable orifice acting in concert. The first variable orifice is connected in series with a second fixed orifice to provide therebetween a resulting pressure on the diaphragm in opposition to the line pressure so that the limiter passes a regulated minimum flow when the control valve to the actuator is opened although the error signal is insufficient to open the gain controlling second variable orifice, whereby the system has a predetermined error threshold, beyond which the system provides increasing gain or response with increasing error.

Other objects and advantages of variable gain actuating systems embodying my invention will become apparent from the following detailed description of presently preferred embodiments thereof read in conjunction with the accompanying drawing forming a part of this specification, and in which the single figure is a schematic illustration of a variable gain fluid operated actuating system embodying the invention.

In the embodiment of the invention illustrated in the drawing, there is provided a variable gain fluid pressure powered actuator system, generally indicated at 10, for positioning a flight control surface 11 of a missile or the like. It will be understood, however, that the embodiment about to be described is given merely as an example of one way in which the invention may be carried out, and that the invention is suited to use in many other applications requiring positioning of an object such as in machine tools, indicators, and the like, in response to signals from means for sensing position, temperature, pressure, etc. The system 10 for positioning the flight control surface 11 comprises a reservoir 12 for hydraulic fluid which is driven by a pump 13 through a check valve 14 into a line 15 at a pressure determined by a relief valve 17 in a recirculating line 18. The pressure line 15 is connected with an accumulator 20 which increases the operating capacity of the system in a well known manner.

The pressure supply line 15 is connected to an inlet passage 22 of a poppet type transfer valve 23 which controls the flow of hydraulic fluid into and out of a reversible or double acting actuator 24 for positioning the flight control surface 11 in a manner which will become apparent as the description proceeds.

The transfer valve 23 of this example comprises four poppet valves 25, 26, 27, and 28 which are normally biased toward their respective seats by coil springs 29.

The valves are arranged to be operated in pairs by a walking beam 30 which is movable about a pivot 31 by an arm 32. The arm 32 is connected at its outer end to an armature 33 which is reciprocable in solenoid coils 34 and 35.

When the walking beam 30 is in its dotted line position, all of the valves are closed, but if the solenoid 35 is energized, the armature 33 will be drawn to its illustrated position rotating the walking beam 30 about its pivot 31 and causing valves 26 and 27 to move to their illustrated open positions. Conversely, energization of the solenoid coil 34 will cause the armature 33 to move to the left through its neutral position and effect opening of valves 25 and 28.

When the solenoid 35 is energized and the valves 27 and 26 are in their open positions, pressure fluid flow may be traced from line 15 through passage 22, valve 26, a line 40, to one end of the cylinder 41 of hydraulic actuator 24. The pressure fluid entering the cylinder 41 through line 40 will drive a piston 42 of the actuator to the left as viewed in the drawing, thereby causing the piston rod 43 to rotate an arm 44 and the flight control surface about a pivot point 45 thereof. Movement of the piston 42 to the left will force hydraulic fluid from the left end of the cylinder 41 into a line 46, through a passage 47, valve 27, and a passage 48 to line 49.

Movement of the walking beam 30 in the opposite direction to close valves 26 and 27 and open valves 25 and 28 will permit a flow of hydraulic fluid which may be traced from the supply line 15 through inlet passage 22, valve 25, a passage 50, and line 46 to the left end of hydraulic cylinder 41. Hydraulic fluid entering the cylinder 41 through line 46 will force the piston 42 and the piston rod 43 to the right so as to effect downward movement of the flight control surface 11. The movement of the piston 42 to the right will also force hydraulic fluid from the right end of cylinder 41 through line 40, a passage 52, valve 28, and a passage 53 into line 49. It will be recognized that when the walking beam 30 is in its dotted line position and all of the valves 25, 26, 27, and 28 are closed, the hydraulic actuator 24 will be hydraulically locked against movement.

Although the poppet type valves 25–28 are particularly desirable in a transfer valve for their long wearing and self cleaning properties making them notably resistant to deleterious effects of contaminants in the hydraulic fluid, this type of valve is primarily a decision or "yes-no" valve and is not readily adapted to regulate the rate of flow of hydraulic fluid to or from the actuator 24.

According to the present invention the rate of flow of hydraulic fluid to and from the actuator 24, and hence the rate of positioning of the flight control surface 11, is controlled by a variable flow limiter 60 which is connected in series between line 49 and a return line 61 to the reservoir 12.

The variable flow limiter 60 comprises an inlet passage 62, having a metering orifice 62a therein, which may hereinafter be described as relatively fixed, connected by a line 63 to the line 49 and leading to a chamber 64 where the hydraulic fluid divides and flows through variable orifice means 65a and 65b governed by valve members 66a and 66b. By relatively fixed is meant that this orifice is fixed for any predetermined set of conditions, such as for a given range of temperature, pressure, position, etc., but this orifice could for example be arranged to enlarge as temperature increases. The variable orifices 65a and 65b are connected by passages 67a and 67b to to the return line 61. The metering orifice 62a provides a pressure drop or difference in chambers 64 and 73 as compared with the pressure in a chamber 72, the pressure being transmitted to the latter chamber by lines 49, 76, and 75. The dual nature of the orifices 65a and 65b, and of the valve members 66a and 66b, serves to cancel effects of fluid flow acting axially on the valve members which are supported on a common stem 68.

For convenience, the valve members 66a and 66b will be referred to collectively hereafter as valve member 66, the variable orifices 65a and 65b will be referred to collectively as variable orifice 65, and passages 67a and 67b will be referred to collectively as passage 67.

Pressure responsive means are provided for positioning valve member 66 to control the rate of fluid flow through variable orifice 65, and hence to control the rate of operation of actuator 24, in response to the pressure difference between chamber 64 and chamber 72, and in response to a control pressure as will be explained more fully hereinafter. To this end, the valve stem 68 extends through a suitable flexible seal 69 into a recess 70 which is divided by a diaphragm 71 into the aforementioned compartment or chamber 72 and a chamber 73, the diaphragm being connected to the stem 68. The chamber 72 is, of course, connected by a passage 75 and a line 76 to the line 49 so that the diaphragm 71 is continually acted upon toward the right by the full pressure of fluid in line 49. It will be recognized that the effect of pressure in chamber 72 against diaphragm 71 is to urge the valve member 66 to restrict the variable orifice 65.

The diaphragm 71 is urged in the opposite or variable orifice opening direction by the effect of pressures in chamber 73, and by a compression spring 80 disposed in the chamber 73 between the diaphragm 71 and an adjustable spring seat 81. The spring seat 81 is conveniently advanced toward or retracted from the diaphragm 71 through the agency of screw means 82 in a wall 60a to vary the loading effect of the spring 80 against the diaphragm in order to select a minimum flow rate through the limiter 60, as will presently be made apparent.

The chamber 73 communicates through a passage 84 and a fixed orifice 85 with the chamber 64 thereby making the diaphragm 71 responsive to the difference between the pressure in chamber 64 and in line 49. In addition, the chamber 73 is connected by a passage 86, a line 87, and a proportional solenoid controlled variable orifice 88 to the line 49. Fluid flow through orifices 88 and 85, which are connected in series with the chamber 73 therebetween, develops a control pressure in the chamber 73 which may be changed in accordance with changes in the variable orifice 88. This control pressure provides for variable loading of the diaphragm 71 in addition to the constant load imposed by spring 80, so that the flow rate through the limiter 60 may be regulated by changing the variable orifice 88.

The variable orifice 88 is defined between a valve member 90 and a seat 91 formed in a valve body 92. The valve body 92 includes a chamber 93 connected by a passage 94 to the line 49, and the valve member 90 is movable to vary the effective area of orifice 88. The valve member 90 is supported by a stem 95 which projects from a solenoid armature 96 into the chamber 93 through a suitable flexible seal 97. A compression spring 98 normally biases the valve member 90 into engagement with the seat 91 to close off the variable orifice 88, but may be overcome by energization of a solenoid 100 to draw in the armature 96.

The solenoid 100 is connected by suitable electrical conductor means 101 to an amplifier 102, and is energized with a current corresponding to an amplified signal applied to the amplifier by command input means 104 through suitable condutcor means 105. The command input means 104 is connected by suitable conductor means 106 to a potentiometer 107 having a wiper 108 which is positioned by the actuator 24 in accordance with the positioning of the control surface 11. The amplifier is also connected by a conductor means 109 to the transfer valve solenoids 34 and 35 to effect actuation of the transfer valve to provide pressure fluid flow to the actuator 24 to provide movement of the flight control surface 11 in the direction corresponding to the signal from the command input means 104. The positioning of the wiper 108 of the potentiometer 107 conditions the command input means 104 to provide a signal for effecting the energization of solenoid 100 in accordance with the degree of movement to be effected in the flight control surface 11, all in a manner which will become apparent as the description proceeds.

The spring 98 is selected to normally hold the valve member 90 closed against seat 91 with a predetermined force so that the energizing signal for solenoid 100 must exceed a predetermined threshold value before the valve member 90 opens to regulate the variable orifice 88. The spring 98 is chosen to be relatively stiff. That is to say, it exhibits predictable increments of length reduction with increases in energizing current of the solenoid 100 and tractive force thereby, so that variation of the variable orifice 88 will be proportional to changes in the electrical signal energizing the solenoid 100.

The operation of the apparatus will now be described wherein the command input means calls for a relatively small degree of downward movement of the flight control surface 11. The command input means 104 sends the signal by conductor means 105 to amplifier 102, which sends a basic direction signal by conductor means 109 to solenoid 35 and actuates the transfer valve 23 to its illustrated position. Simultaneously, the amplifier sends a signal corresponding to the degree of required movement to the solenoid 100 by the conductor means 101. In this example, however, the degree of correction signal is below the threshold value required to move valve member 90 from its seat 91, and so variable orifice 88 remains closed off.

The flow of hydraulic fluid to the actuator 24 through the transfer valve 23 will be as described previously, with the rate of movement of the piston 42 being at the minimum or below threshold rate permitted by the flow limiter 60. In this condition, the flow of hydraulic fluid in series through the fixed orifice 62a and the variable orifice 65 will produce in chamber 64 therebetween a resulting pressure difference with respect to the pressure in line 49. Since chamber 64 communicates via passage 84 to the chamber 73 on one side of the diaphragm 71, and since line 49 communicates through a line 76 and passage 75 to chamber 72 on the other side of the diaphragm, fluctuations in the pressure of line 49 with respect to the return line 61, such as result from changing loads on the flight control surface 11, will be nullified as the diaphragm 71 seeks a balanced position in which the lowest selected maximum flow of hydraulic fluid will be maintained as selected by adjusting the screw 82 to determine the loading effect of spring 80 on the diaphragm. The movement of the actuator 24 and the flight control surface 11 will continue at the predetermined lowest selected maximum rate until the wiper 108 of the potentiometer 107 moves to a position wherein the command input signal is cancelled, at which time the solenoid 35 will be deenergized and the transfer valve 23 will lock the flight control surface against further movement until a new command input signal arises.

Assuming now that the command input means 104 calls for a large degree of upward movement of the flight control surface 11, a basic direction signal will be sent by the amplifier 102 through conductor means 109 to the solenoid 35 actuating the transfer valve to its illustrated position. Simultaneously, a relatively large error signal corresponding to the degree of movement required will be sent by the conductor means 101 to the solenoid 100. The latter will effect a proportionately large movement of the valve member 90, and will provide the variable orifice 88 with a substantial flow area. Hydraulic fluid flowing from the line 49 through variable orifice 88, chamber 73, and fixed orifice 85 will thereupon establish in chamber 73 a substantially large control pressure acting in concert with spring 80 to increase the load on the diaphragm 71. The diaphragm therefore seeks a new balance position and the valve member 66 is moved to the left, increasing the effective area of variable orifice 65 and permitting an increased rate of flow of hydraulic fluid from the actuator cylinder 41 through the line 49, flow limiter 60, and return line 61 to the reservoir.

The flight control surface 11 is thereby subjected to relatively rapid initial corrective movement. This movement is accompanied by movement of the potentiometer wiper 108 which effects a progressive reduction of the command input signal and of the error signal being applied to the solenoid 100. The variable orifice 88 is therefore progressively reduced in effective area which results in a corresponding reduction in the control pressure in chamber 73 and restriction of variable orifice 65. As the orifice 65 becomes more restricted the velocity or rate of movement of the piston 42 and the flight control surface 11 decreases. It will be recognized from the foregoing sequence of events that as the flight control surface 11 approaches its new position, its rate of movement will decrease until the predetermined minimum ceiling rate is reached as determined by the error signal threshold of the solenoid 100. Thereafter the flight control surface cannot be moved any faster than that lowest maximum rate until the potentiometer cancels the command.

From the foregoing description of an exemplary actuator system 10 embodying the invention, and from the described operation thereof, it will be appreciated that the present invention has provided an improved actuator system having a variable gain response which produces rapid, high velocity positional correction while the position error is large, and a decreasing rate of correction as a desired position is appoached. It will also be appreciated that the invention permits particularly fine and accurate actuation while permitting the use of poppet type control or transfer valves which are insensitive to hydraulic fluid contaminants. In addition, the invention achieves the foregoing variable gain characteristics while substantially reducing electric power requirements.

While the foregoing exemplary embodiment utilizes a transfer valve 23 and double acting actuator 24 to provide bi-directional control, a single control valve and single acting actuator may be substituted in the combination to provide a variable gain response in one direction, with other means such as springs or the like for providing a rapid return such as is often desired in machine tool actuation. Also, while the exemplary embodiment given relates to the positioning of a flight control surface for a missile or the like, the invention may be utilized wherever a variable gain response is desired in a hydraulic actuator system.

Of course, other pressure difference responsive means than the diaphragm 71 may be used, and other signal responsive means than the solenoid 100 and armature 96 may be used for controlling the variable orifice 88. For example, bellows, a piston, Bourdon tube or the like, could be used in place of diaphragm 71, while similar pressure responsive means could be employed to control orifice 88, rather than solenoid 100, if it were desired to make the system responsive to fluid pressure signals instead of electrical signals.

It will be recognized that because the flow limiter means is connected in series with the actuator 24, the order of connection in the series may be varied without changing the effectiveness. Additionally, the order of the series connected orifices 66, 62a, and 85, 88 may be reversed and, while it is only necessary that one orifice in each series be variable, the fixed orifices 62a and 85 could be made variable to provide a flow limiter which can be adjusted to suit a particular application.

Many other such modifications will be apparent to those skilled in the art to which the invention pertains. Accordingly, although the invention has been described in considerable detail with reference to a specific variable gain actuator system, it will be understood that the invention is not limited thereto, but rather the invention includes all those modifications, substitutions, adaptations, and uses as are reasonably embraced by the scope of the claims hereof.

Having described my invention, I claim:

1. Variable flow limiting means for connection in series with a fluid operated actuator so as to control the rate of actuation by limiting the rate of fluid flow therethrough, said variable flow limiting means comprising first and second pairs of orifices, through each of which flow from a fluid source may take place, one orifice of each pair of orifices being a relatively fixed orifice and the other orifice of each pair of orifices being a variable orifice, the flow through said first pair of said orifices being a primary flow, and the flow through the second pair of orifices being a pilot flow, first and second pressure chambers having a pressure responsive means disposed therebetween, the movements of said pressure responsive means in response to pressure difference in said chambers serving to vary the flow through the variable orifice of said first pair of orifices, said first of said pressure chambers being connected to sense the pressure drop occurring across said first fixed orifice as the result of flow therethrough, and the second pressure chamber being connected to sense the source pressure, and signal responsive means operative to vary the effective area of said second variable orifice, so as to vary the pressure drop thereacross, the latter pressure drop being communicated to said first chamber, said change in area of said second variable orifice modulating the position of said first variable orifice to regulate the primary fluid flow in accordance with said signal changes.

2. Variable flow limiting means for connection in series with a fluid operated actuator so as to control the rate of actuation by limiting the rate of fluid flow therethrough, said variable flow limiting means comprising first and second pairs of orifices, through each of which flow from a fluid source may take place, and across which a pressure drop may on occasion occur, one orifice of each pair of orifices being a relatively fixed orifice and the other orifice of each pair of orifices being a variable orifice, the flow through a first pair of said orifices being a primary flow, and the flow through the second pair of orifices being a pilot flow, first and second pressure chambers having a pressure responsive means disposed therebetween, said first pressure chamber being connected to sense the pressure drop occurring across said first fixed orifice and said second pressure chamber being connected to sense the source pressure, the movements of said pressure responsive means in response to pressure differences in said chambers serving to vary the flow through the variable orifice of said first pair of orifices, said first pressure chamber being connected to also reflect the pressure drop across said second pair of orifices, and signal responsive means operative to vary the effective area of said second variable orifice, so as to vary the pressure drop communicated to said first chamber, and thereby to modulate the position of said first variable orifice to regulate the primary fluid flow in accordance with said signal changes.

3. Variable flow limiting means for connection in series with a fluid operated actuator so as to control the rate of actuation by limiting the rate of fluid flow therethrough, said variable flow limiting means comprising means defining a first pair of orifices connected in series, with at least one of said orifices being a variable orifice, means for impressing from a source of relatively high pressure fluid, a flow of fluid through said orifices, with the resulting pressure drop thereacross being related to the area of said first variable orifice, means defining first and second pressure chambers, with pressure difference responsive means disposed therebetween, said first pressure chamber being connected to reflect the pressure existing between said first pair of orifices, and the second pressure chamber being connected to reflect the pressure of said source of relatively high pressure fluid, said pressure difference responsive means being operative to vary the effective area of said first variable orifice in response to changes in pressure difference between said first and second chambers, means defining a second pair of orifices disposed in series, through which a flow of fluid can take place parallel to the flow through the first pair of orifices, and across which a pressure drop may on occasion occur, at least one of latter orifices being a variable orifice, means connecting said first chamber to sense said pressure drop across said second pair of orifices so as to establish in said first pressure chamber a control pressure related to the effective area of said second variable orifice, and signal responsive means operative to vary the effective area of said second variable orifice, and therefore the pressure in said first chamber so as to bring about control of the fluid flow through said first pair of orifices in response to signal changes to said signal responsive means.

4. The variable flow limiting means as defined in claim 3 in which spring means is disposed in said first chamber to compensate for the normaly higher pressure in said second chamber, with said control pressure transmitted to said first chamber in effect serving to vary the setting of said spring.

5. Variable flow limiting means for connection in series with a fluid operated actuator so as to control the rate of actuation by limiting the rate of fluid flow therethrough, said variable limiting means comprising:
   (a) means defining a first pair of orifices connected in series with a first pressure chamber connected therebetween, and including at least a first variable orifice so that fluid flow through said first pair of orifices from a relatively high pressure to a relatively low pressure will establish in said first chamber a resulting pressure related to the area of said first variable orifice,
   (b) means defining a second pressure chamber in communication with said relatively high pressure,
   (c) pressure difference responsive means disposed between said first and second chambers and operative to vary the effective area of said first variable orifice in response to changes in pressure difference between said first and second chambers,
   (d) means defining a second pair of orifices connected in series with said first pressure chamber therebetween, and including at least a second variable orifice so that fluid flow through said second pair of orifices will establish in said first chamber a control pressure related to the effective area of said second variable orifice, and
   (e) signal responsive means operative to vary the effective area of said second variable orifice and the control pressure in said first chamber, whereby said first variable orifice is positioned by said pressure difference responsive means to regulate said fluid flow in accordance with signal changes.

6. Variable flow limiting means for connection in series with a pressure fluid operated actuator so as to control the rate of actuation by limiting the rate of flow therethrough, said variable limiting means comprising:
   (a) means defining a metering orifice and variable orifice connected in series with a first pressure chamber connected therebetween so that fluid flow through said orifices from a relatively high pressure to a relatively low pressure will establish in said first chamber a resulting pressure related to the ratio of effective areas of said metering and variable orifices,
   (b) means defining a second pressure chamber for connection with said high pressure,
   (c) pressure differential responsive means disposed between said first and second chambers and operative to vary the effective area of said variable orifice in response to changes in pressure difference between said chambers and in a direction tending to seek a balance position therebetween,
   (d) biasing means acting on said pressure differential responsive means whereby said pressure differential respsonsive means seeks a balance position providing a predetermined flow rate through said variable orifice, and (e) signal responsive means for varying the pressure in said second chamber in accordance with signal variations, whereby said pressure differential responsive means will seek balance positions corresponding thereto and will cause said variable orifice to vary said flow rate in accordance with said signal variations.

7. Variable flow limiting means as defined in claim 6, wherein said pressure differential responsive means comprises movable wall means, and said biasing means comprises spring means acting in one direction on said movable wall means and adjustable to select said predetermined flow rate.

8. Variable flow limiting means for connection in series with a pressure fluid operated actuator so as to control the rate of actuation by limiting the rate of flow therethrough, said variable limiting means comprising:

(a) means defining a first pair of orifices including a metering orifice and a first variable orifice with a first pressure chamber therebetween so that fluid flow through said orifices from a relatively high pressure to a relatively low pressure will establish in said first chamber a resulting pressure related to the ratio of effective areas of said metering and variable orifices, (b) means defining a second chamber for connection with said high pressure, (c) means defining a second pair of orifices including a second variable orifice connected in series with said first pressure chamber therebetween so that fluid flow through said second pair of orifices in parallel to the flow through the first pair of orifices will establish in said second chamber a control pressure related to the effective area of said second variable orifice, (d) pressure differential responsive means disposed between said first and second chambers and operative to vary the effective area of said variable orifice in response to changes in pressure difference between said chambers and in a direction tending to seek a balance position therebetween, (e) biasing means acting on said pressure differential responsive means whereby said pressure differential responsive means seeks a balance position providing a pretetermined flow rate through said first variable orifice, and (f) signal responsive means for varying the effective area of said second variable orifice and the control pressure in said second chamber in accordance with signal variations, whereby said pressure differential responsive means will seek balance positions corresponding thereto and will cause said first variable orifice to vary said flow rate in accordance with said signal variations.

9. Variable flow limiting means as defined in claim 8 and wherein said pressure differential responsive means comprises movable wall means, and said biasing means comprises spring means acting in one direction on said movable wall means and adjustable to select said predetermined flow rate.

10. Variable flow limiting means as defined in claim 8 and wherein said signal responsive means comprises solenoid means including an armature operative to position a valve member with respect to said second variable orifice so as to vary the effective area thereof in proportion to said signal variations.

11. Variable flow limiting means as defined in claim 10, wherein said second variable orifice is normally closed by said valve member so that said biasing means determines a minimum flow rate, and wherein said solenoid is responsive only to signals above a predetermined threshold to vary said second variable orifice and said flow rate in proporiton to said signal variations.

12. In a variable gain fluid pressure operated actuator system for positioning an object, flow limiter means comprising:

(a) pressure fluid conducting means including a first relatively fixed orifice and a first variable orifice connected in series so that fluid flow from a relatively high pressure through said orifices to a relatively low pressure will establish a resulting pressure drop, said fixed orifice being upstream of said variable orifice, (b) means defining a first chamber for connection to sense said pressure drop and a second chamber for connection to said high pressure, (c) pressure responsive means disposed between said first and second chambers urged in one direction by pressure in said first chamber to increase said first variable orifice, and urged in the other direction by pressure in said second chamber to decrease said first variable orifice, (d) biasing means continually urging said pressure responsive means to increase said first variable orifice so that said pressure responsive means seeks a balance position providing a predetermined minimum flow rate through said first variable orifice, (e) a second variable orifice and a second relatively fixed orifice connected in series between said high pressure and a lower pressure so that fluid flow therethrough establishes a control pressure between the second fixed orifice and the second variable orifice, (f) solenoid operated valve means for changing the effective area of said second variable orifice and said control pressure in proportion to an object position related electrical signal, (g) means connecting said second chamber to sense said control pressure, and (h) said pressure responsive means being responsive to increases in said control pressure to increase said first variable orifice and to seek a balance position in which said flow corresponds to said signal.

13. Variable flow limiting means as defined in claim 12 wherein said pressure responsive means comprises a diaphragm connected to a valve member for controlling said first variable orifice, and said biasing means comprises adjustable spring loading means acting on said diaphragm.

14. A variable gain fluid pressure operated actuator system for positioning an object, said system comprising:

(a) a control valve, (b) an object positioning actuator, (c) means defining a first pair of orifices including a metering orifice and a first variable orifice with a first pressure chamber therebetween, said orifices being connected in series with said actuator so that fluid flow therethrough must flow through said orifices and will establish a pressure in said first chamber in relation to the effective area of said first variable orifice and compared to relatively high pressure upstream of said orifices, (d) means defining a second pressure chamber in communication with said high pressure, (e) pressure differential responsive means disposed between said first and second chambers and operative to vary the effective area of said first variable orifice in responsive to changes in pressure differential between said first and second chambers and in a direction tending to seek a balance position therebetween, (f) biasing means acting on said pressure differential responsive means whereby said pressure differential responsive means seeks a balance position providing a predetermined lowest maximum rate of flow through said first variable orifice and through said actuator, (g) means defining a second pair of orifices including a second variable orifice connected in series with said first chamber therebetween so that fluid flow through said second pair of orifices from said high pressure to a lower pressure will develop in said first chamber a control pressure related to the effective area of said second variable orifice, (h) signal responsive means for varying the effective area of said second variable orifice and the control pressure in said second chamber in accordance with signal variations, whereby said pressure differential responsive means will seek balance position corresponding thereto and will cause said first variable orifice to vary said flow rate in accordance with said signal variations, and (i) object position responsive means for conditioning said signal to reduce said flow rate as said actuator moves said object toward a predetermined desired position.

References Cited by the Examiner
UNITED STATES PATENTS

| | | | |
|---|---|---|---|
| 1,798,973 | 3/1931 | Cordier | 251—30 |
| 2,575,085 | 11/1951 | Alyea | 91—387 |
| 2,893,354 | 7/1959 | Austin et al. | 91—407 |
| 3,013,532 | 12/1961 | Harper | 91—405 |

SAMUEL LEVINE, *Primary Examiner.*

FRED E. ENGELTHALER, *Examiner.*